(12) United States Patent
Takahashi

(10) Patent No.: US 6,308,329 B1
(45) Date of Patent: Oct. 23, 2001

(54) PUSH TYPE DATA DISPLAY METHOD, RECEIVING APPARATUS, AND DISPLAY DEVICE

(75) Inventor: Naomasa Takahashi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/195,261

(22) Filed: Nov. 18, 1998

(30) Foreign Application Priority Data

Nov. 28, 1997 (JP) .................................................. 9-327347

(51) Int. Cl.⁷ ...................................................... H04N 7/16
(52) U.S. Cl. .......................... 725/153; 348/552; 348/564
(58) Field of Search ........................ 345/327; 705/219; 348/552, 10, 564, 588, 569, 563; 725/23, 32, 60, 133, 141, 153

(56) References Cited

U.S. PATENT DOCUMENTS

| | | | |
|---|---|---|---|
| 5,861,883 | * | 1/1999 | Cuomo et al. ........................ 345/326 |
| 5,864,823 | * | 1/1999 | Levitan .................................... 105/14 |
| 5,877,755 | * | 3/1999 | Hellhake ............................... 345/327 |
| 5,978,836 | * | 11/1999 | Ouchi ..................................... 709/206 |
| 5,987,454 | * | 11/1999 | Hobbs ....................................... 707/4 |
| 6,011,537 | * | 1/2000 | Slotznick ............................ 345/115 |
| 6,021,419 | * | 2/2000 | Clarke, Jr. et al. .................. 708/300 |
| 6,021,433 | * | 2/2000 | Payne et al. .......................... 709/219 |
| 6,047,317 | * | 4/2000 | Bisdikian et al. .................... 709/217 |

* cited by examiner

*Primary Examiner*—Victor R. Kostak
(74) *Attorney, Agent, or Firm*—Frommer Lawrence & Haug LLP.; William S. Frommer; Joe H. Shallenburger

(57) ABSTRACT

A display device consisting of an LCD or the like is provided on the front of a set-top box employed as an entrance to receive push type data, and information of a push type data service representing sports, news, weather forecast and so forth are displayed thereon. Such information is displayed by sequentially presenting the data transmitted by the push technology or in accordance with the contents selected previously by each user. Push type data can always be displayed continuously without the necessity of operating a personal computer and so forth.

3 Claims, 10 Drawing Sheets

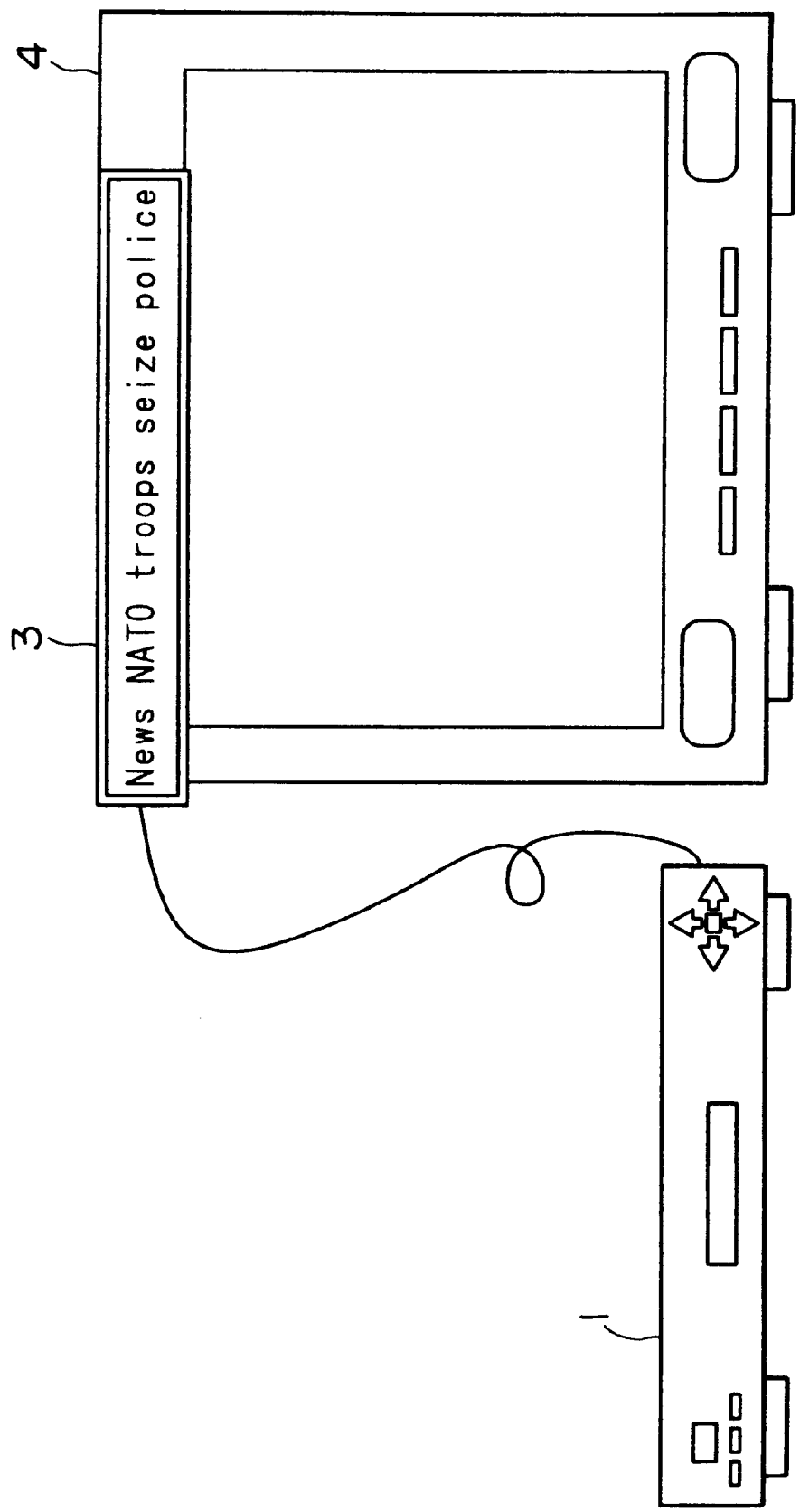

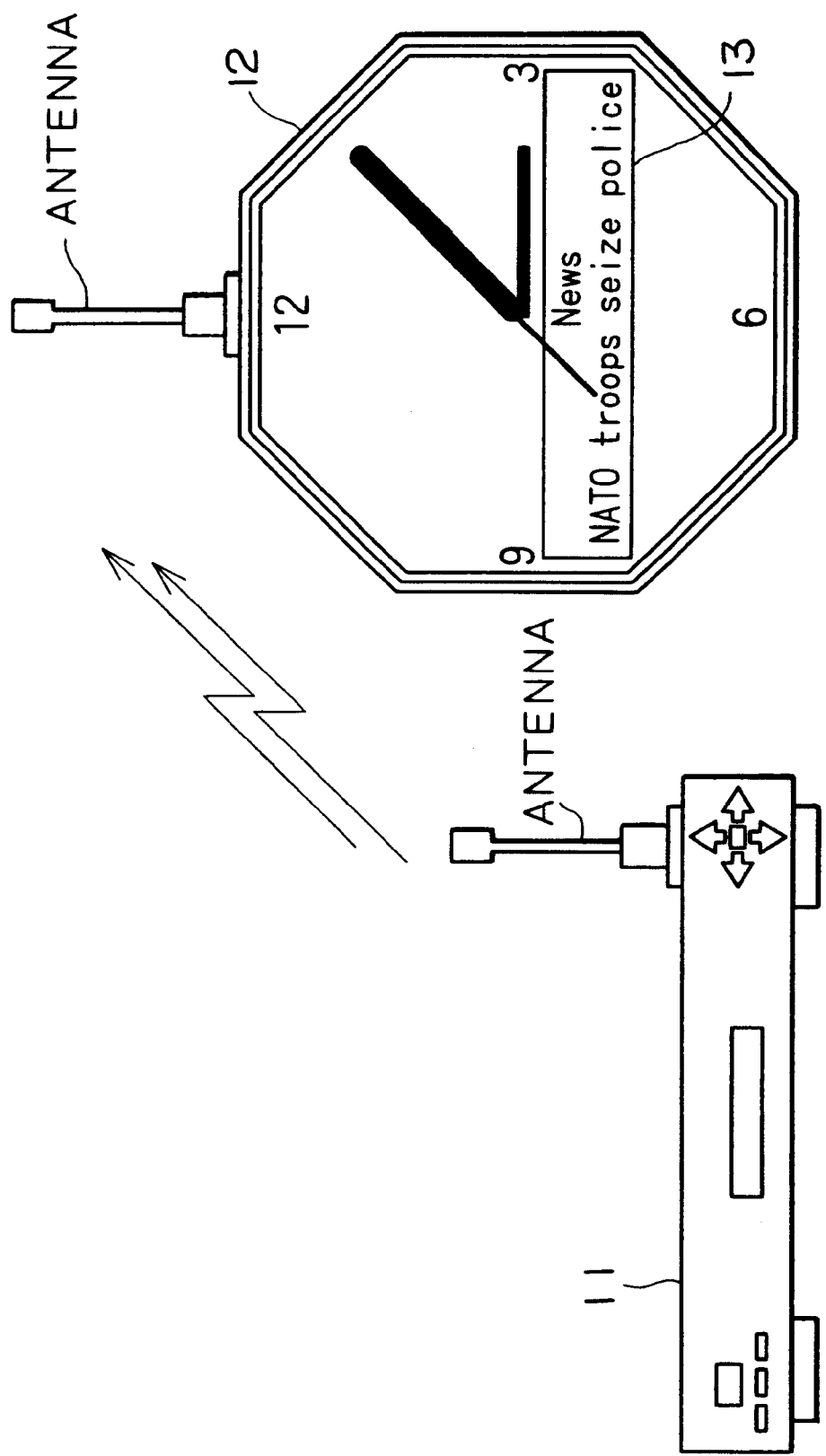

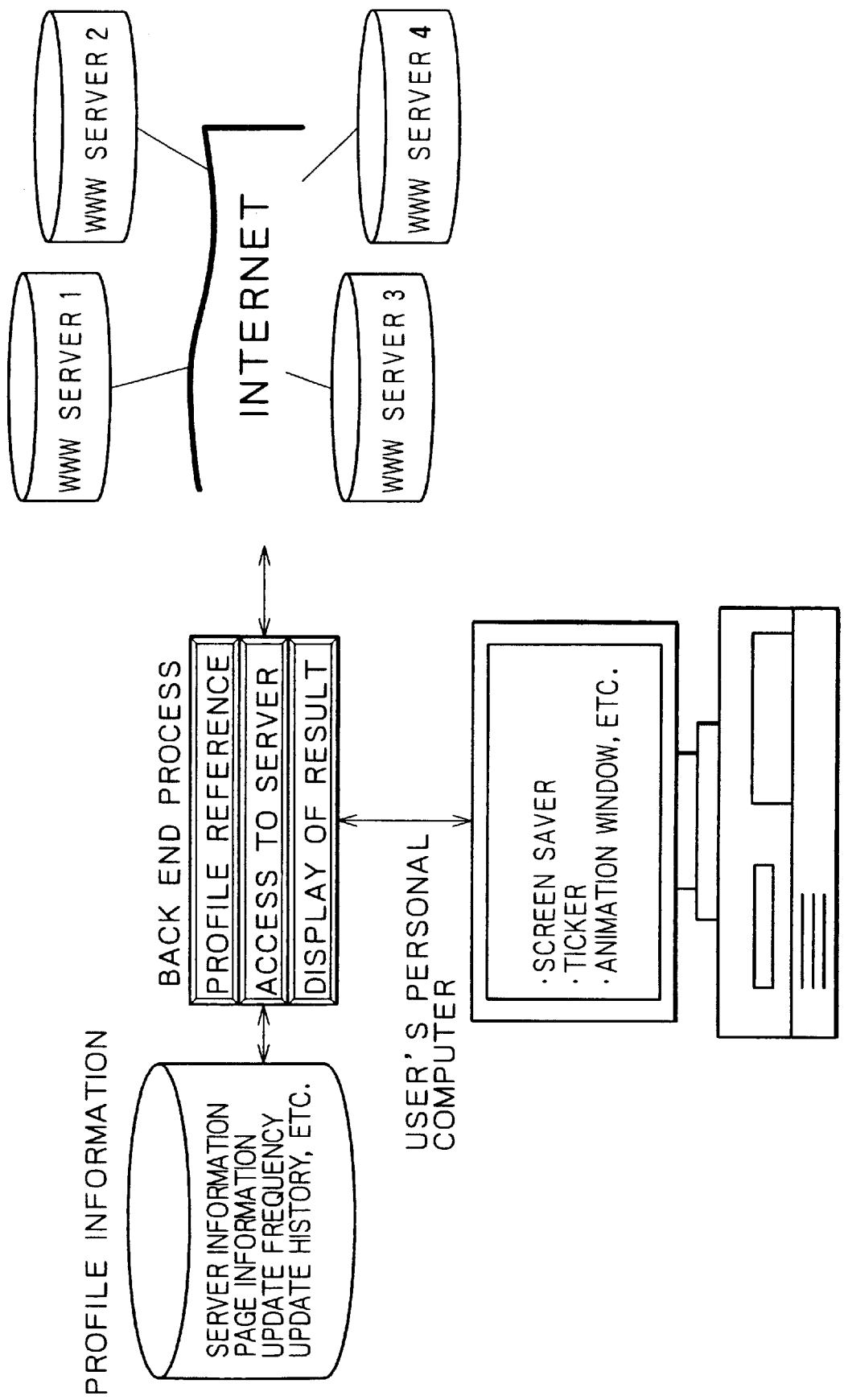

PUSH TYPE DATA DISPLAY METHOD, RECEIVING APPARATUS, AND DISPLAY DEVICE

BACKGROUND OF THE INVENTION

The present invention relates to the technology of displaying push type data by the use of Internet, satellite broadcast, terrestrial-wave broadcast, cable television or the like, and more particularly to a method and a device for displaying push type data on an apparatus which serves as an entrance to receive such data.

In receiving video, audio or data via a cable, satellite, terrestrial waves or telephone line, it is fundamentally necessary in most cases to employ a set equipped internally with a device or an adaptor to receive such data, or a set-top box (hereinafter referred to as STB) provided separately.

In this case, the use of a global network such as Internet may be contrived in combination with the above infrastructure, and it is generally customary to employ a pull type service on the premise that a manipulation for receiving a distribution service is actively performed. However, when a pull type service is received, it is considered that, in general homes, the practical operating time to appreciate such service is short in most cases.

In contrast with the pull type service mentioned, there is known a push type service as a passive one represented by broadcasting. This service is so contrived as to directly deliver the information, which is existent in a server, to the desk-top environment of each end user while realizing automatic delivery of the information without the necessity of active retrieval or reference by the end user.

The contents of the push type data service employed in the Internet and so forth are composed of successively changing information such as news flash or economic information, so that some merits may be attainable by displaying the information continuously to a certain extent. Utilizing such characteristics, it is currently customary in practical use that push type service information is displayed in place of a screen saver on a personal computer or is displayed normally in one corner of the screen thereof.

FIG. 9 shows a network configuration for processing push type data by the use of Internet, and FIG. 10 shows a system configuration where the user's personal computer in FIG. 9 is included as a central processor. In this network, client software exclusively for a push type data service is installed in the end user's personal computer. And in the client software, there are previously registered communication environments inclusive of the user's electronic mail address, the mode of connection to the Internet, and the presence or absence of a proxy server, and also a desired field (channel) selected out of the fields prepared by an information provider. Further the access frequency to the server and the time slot for execution of access are preset, so that the client software accesses the server automatically to thereby download the latest information.

Currently the information delivered from a push type server to a client is displayed automatically on a screen saver of a personal computer or an electronic ticker thereof. Accordingly, due to mere previous registration of any desired field or channel such as economic information, news or sports information, it becomes possible for each end user to always grasp the latest information delivered to the desk-top environment. It is presumed in particular that the ticker is now regarded steadily as a standard GUI (graphical user interface) with development of the technology relative to the push type service.

In order to display the push type service mentioned above, it is necessary to boot up the personal computer and so forth, whereby some inconvenience is generally unavoidable in ordinary home circumstances where the power supply of the personal computer or the like is turned on merely in specific time zones differently from office circumstances where such power supply is kept in its on-state continuously.

Regarding display also, with the exception of a screen saver type, there exists a possibility that the processing capability of the personal computer and so forth is wasted excessively due to the use of a corner or portion of a display device or a television screen to consequently narrow the display area.

Further, with respect to a modem or an STB using a telephone line or a cable to receive data, it is presumed that, if such pull type service is premised, the operating time is rendered shorter and the prepared infrastructure is not utilized effectively.

SUMMARY OF THE INVENTION

It is therefore an object of the present invention to provide a method and a device capable of always displaying push type data as a stand-alone without the necessity of operating a data-receiving personal computer and so forth.

According to a first aspect of the present invention, there is provided a push type data display method which comprises an incorporated display means in a receiving apparatus as an entrance to receive push type data or in a device connected electrically to such a receiving apparatus, and displaying the push type data on the display means.

According to a second aspect of the present invention, there is provided a push type data receiving apparatus equipped with a means for displaying push type data thereon.

And according to a third aspect of the present invention, there is provided a push type data display device for displaying push type data obtained from a push type data receiving apparatus.

In the present invention, a separate simple display means is incorporated in a modem, an STB or a router which is a receiving apparatus as an entrance to receive push type data, and the data are presented visually on an electric ticker for example. The display means may be incorporated in a clock or the like connected electrically to the receiving apparatus.

The above and other features and advantages of the present invention will become apparent from the following description which will be given with reference to the illustrative accompanying drawings.

BRIEF DESCRIPTION OF THE DRAWINGS

FIG. 2 illustrates an example where a display device is provided independently of an STB and is attached to a suitable easy-to-see position of a television receiver or the like;

FIG. 4 illustrates an example where a display unit is incorporated in a clock;

FIG. 10 shows a system configuration where the user's personal computer in FIG. 9 is centered.

DESCRIPTION OF THE PREFERRED EMBODIMENTS

Hereinafter some preferred embodiments of the present invention will be described in detail with reference to the accompanying drawings.

Figure 1A:
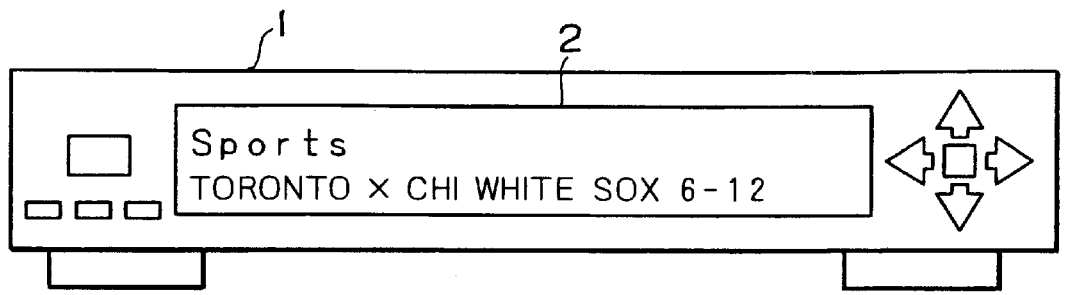
FIGS. 1A to 1C illustrate examples where the present invention is applied to an STB.
Figure 1B:
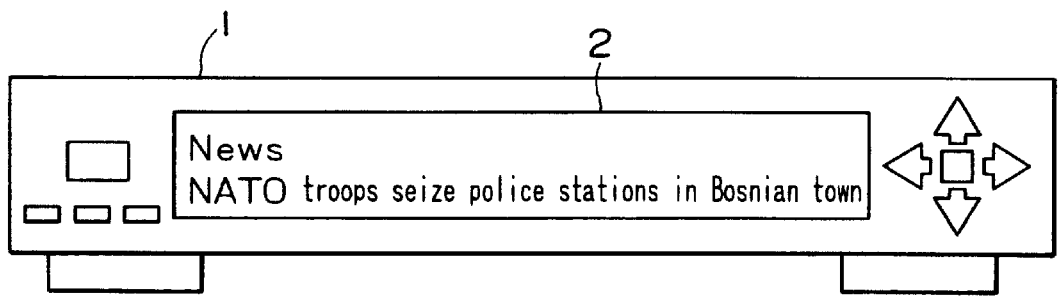
Figure 1C:
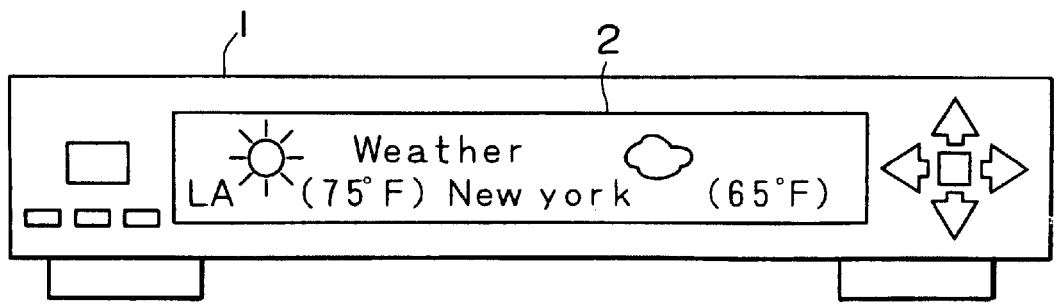

FIGS. 1A to 1C illustrate examples where the present invention is applied to a set-top box (STB). A display unit 2 consisting of an LCD or the like is provided on the front of an STB 1 which serves as an entrance for receiving push type data, and information relative to a push type data service is displayed thereon. FIGS. 1A, 1B and 1C represent how sports, news and weather forecast are displayed in this order, respectively. Such information is visually presented with sequential display of the data transmitted by the push technology, or in accordance with the contents selected by each user.

Figure 3A:
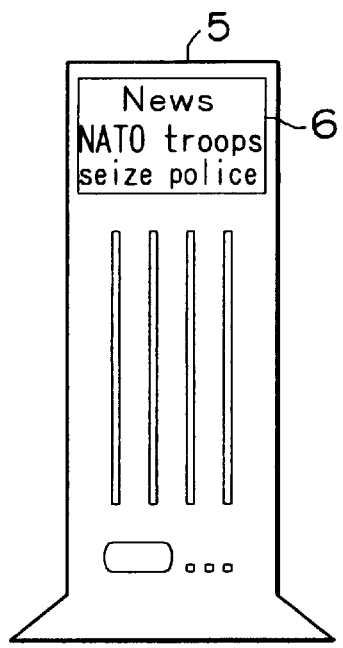
FIGS. 3A to 3C illustrate examples where a display unit is provided in a television receiver.
Figure 3B:
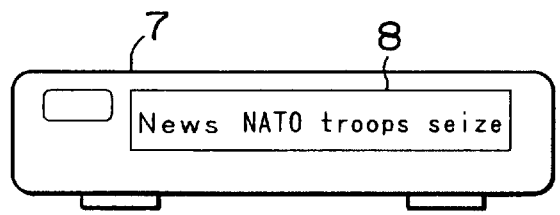
Figure 3C:
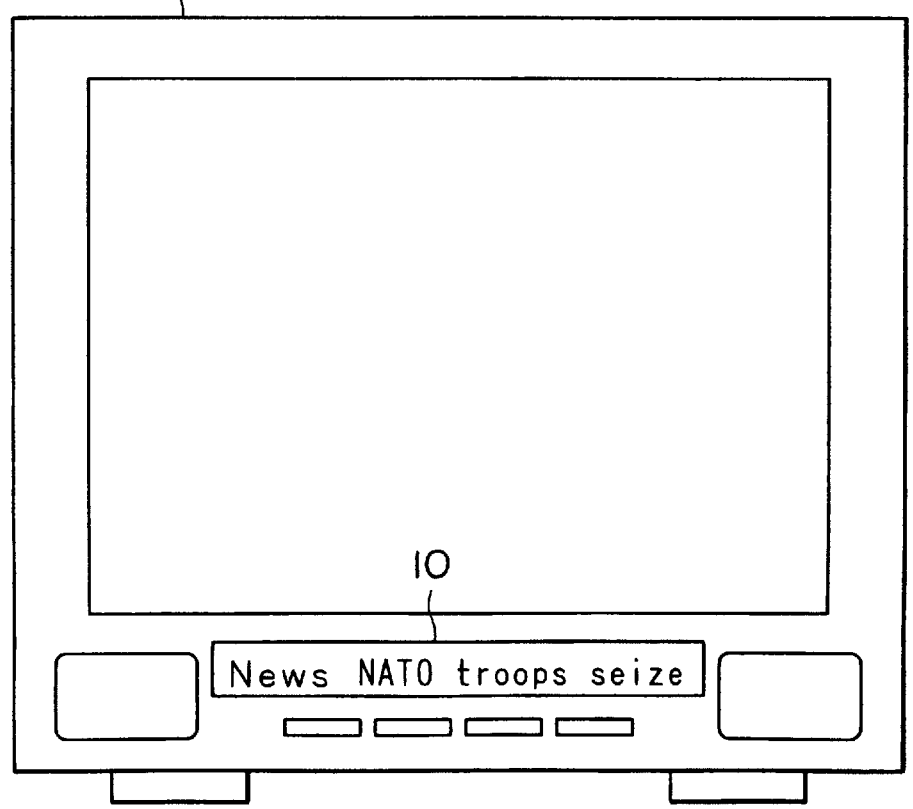

FIG. 2 illustrates an example where a display device 3 connected electrically to an STB 1 is provided independently thereof and is attached to a suitable easy-to-see position of a television receiver 4 or the like. FIG. 3A illustrates an example where a display unit 6 is provided in a terminal adaptor (TA) 5; FIG. 3B illustrates another example where a display unit 8 is provided in a modem 7; and FIG. 3C illustrates a further example where a display unit 10 is provided on a television receiver 9 or the like separately from its video display screen. And FIG. 4 illustrates an example where a display unit 13 is incorporated in a clock 12, and RF or IR data received wirelessly by an STB 11 or the like are transferred therefrom to be displayed.

Fundamentally, the contents to be presented on such a display unit or a display device are composed mostly of characters. However, depending on the structure of the display device or the system configuration, it is naturally possible to display simple graphics and so forth as well.

Figure 5:
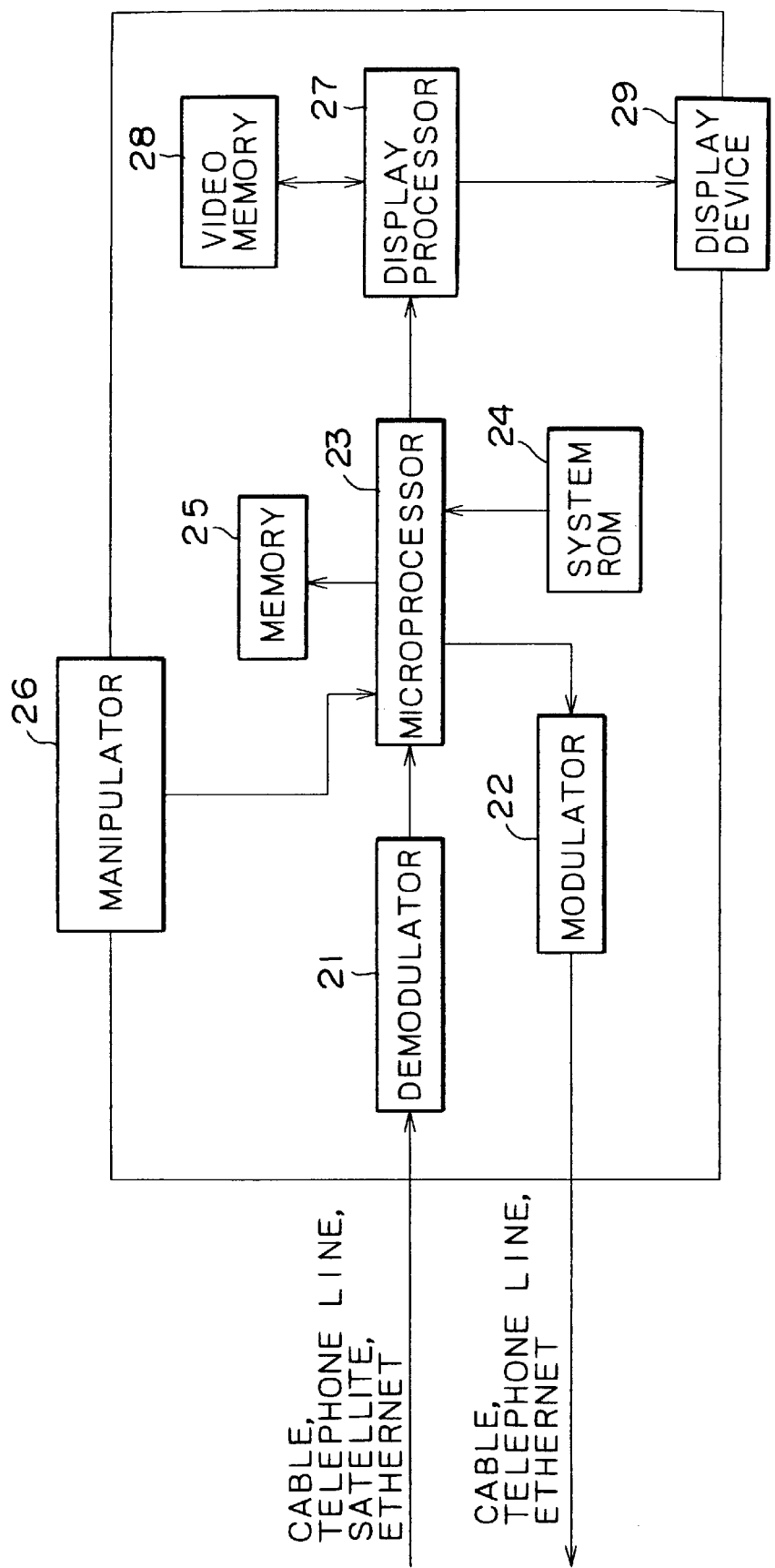
FIG. 5 is a block diagram showing an exemplary configuration of an apparatus to realize an STB or a modem.

FIG. 5 is a block diagram showing an exemplary configuration of an apparatus to realize the STB or modem mentioned above. This apparatus comprises a demodulator 21 for demodulating data inputted from a cable, telephone line (analog, ISDN), satellite, Ethernet or the like; a modulator 22 for outputting data to the cable, telephone line, Ethernet or the like; a microprocessor 23 for controlling the entire apparatus; a system ROM 24 and a memory (RAM) 25 connected to the microprocessor 23; a manipulator 26 for inputting a user's command to the microprocessor 23; a display processor 27; a video memory 28 connected to the display processor 27; and a display device (LCD, etc.) 29.

Figure 6:
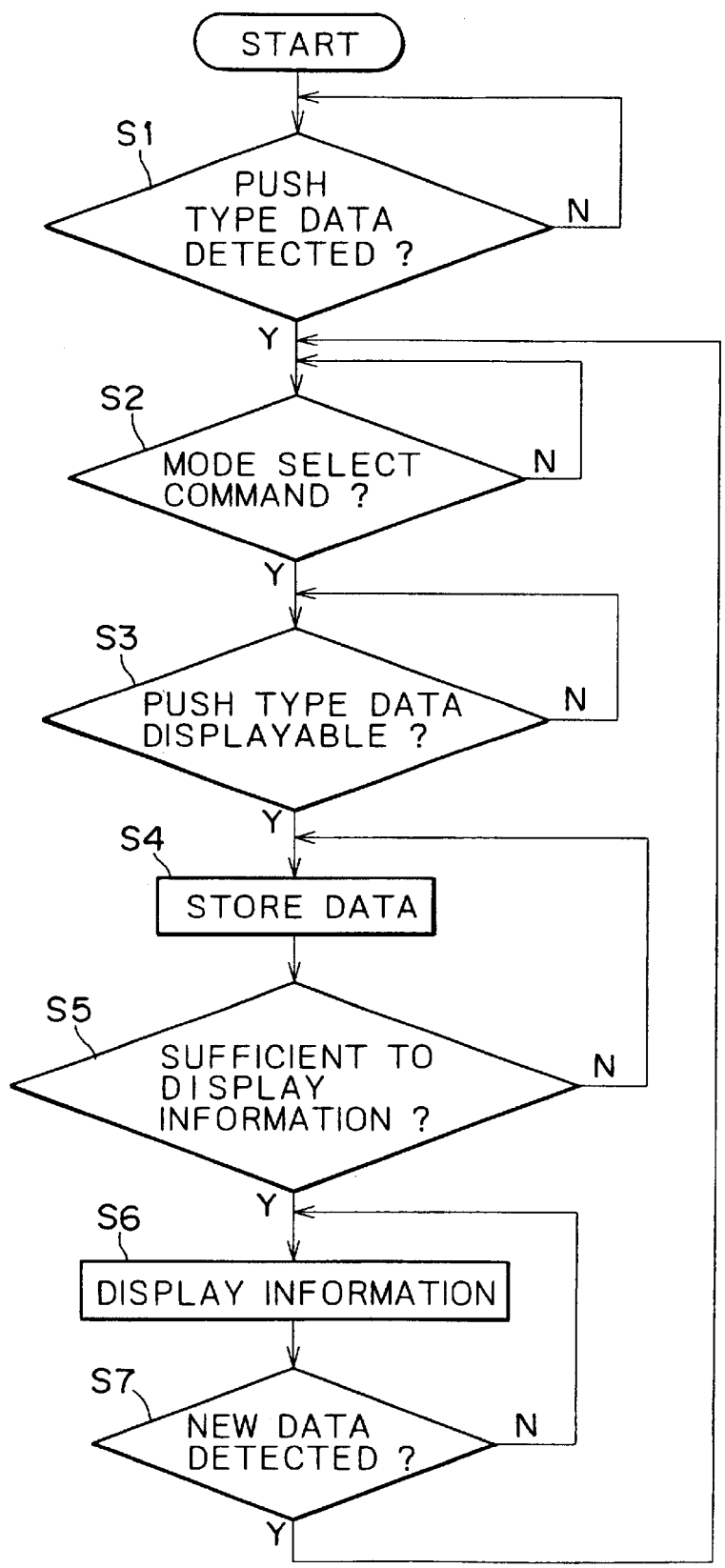
FIG. 6 is a flowchart showing an operation performed in the apparatus of FIG. 5.

The operation performed in the apparatus of FIG. 5 will now be described below with reference to a flowchart of FIG. 6.

The data inputted from a cable, telephone line, satellite or Ethernet are demodulated by the demodulator 21 and then are stored in the memory 25 via the microprocessor 23.

The data in the memory 25 are read out therefrom by the microprocessor 23, and then a decision is made as to whether push type data have been detected or not (step S1). If the result of this decision signifies detection of push type data, another decision is made as to whether a mode select command has been inputted or not from the manipulator 26 (step S2). This mode select command is used for setting, for example, the presence or absence of display of graphic data or the size of characters to be displayed.

In response to input of a mode select command, a decision is made as to whether push type data can be displayed or not (step S3). More specifically, when the display device 29 consists of an LCD for example, there may occur an occasion where graphic data cannot be displayed, so that a decision is necessary to find if display of the data is possible or not. And if the result of this decision signifies that display is possible, the display processor 27 stores the data in the video memory 28 (step S4).

In case the data stored in the video memory 28 are sufficient in quantity to be displayed, the display processor 27 reads out the data from the video memory 28 and then displays the same on the display device 29 (steps S5 and S6). And when new data are detected, the processing from step S2 is repeated (step S7).

Now the method for detection of push type data shown at step S1 will be described below.

Figure 7:
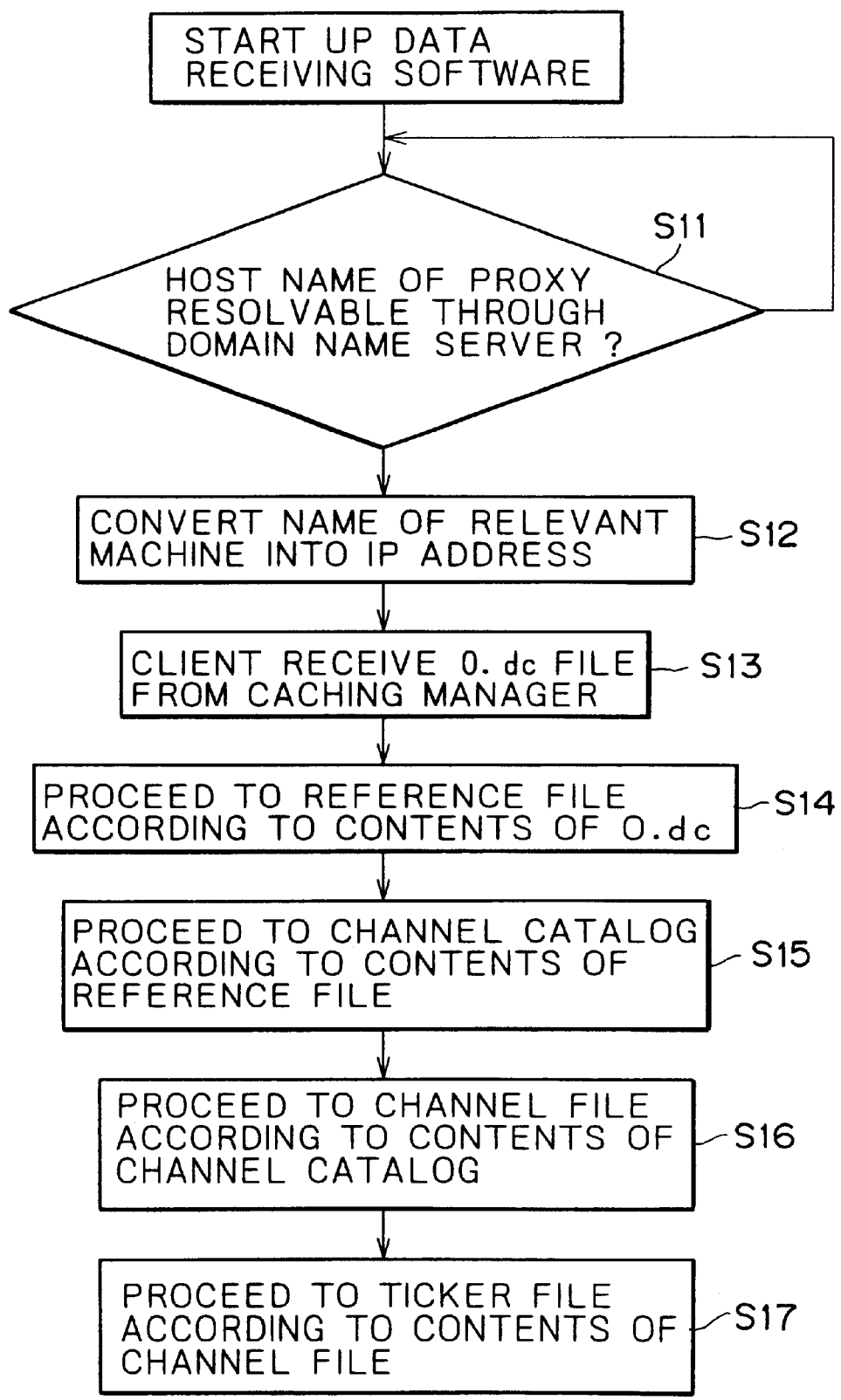
FIG. 7 shows an exemplary processing routine executed for detection of push type data.

If the push type data are composed originally in a format conforming with this system, there exists no necessity of resolving the displayable data. However, in the case of push type data which are currently in practical use, resolution of display data is necessary. Referring to a flowchart of FIG. 7 and a data structure of FIG. 8, an explanation will be given on a data detection method adopted when displaying data of Point Cast (trade name of Point Cast Corporation) which is a typical push type service currently available.

First, a client boots up Point Cast (trade name) which is a software for receiving the data delivered by the service of Point Cast Corporation. Then, for the purpose of receiving the service, the client sends a request to the domain name server (DNS) to make a decision as to whether the host name "PCNPROXY" can be resolved or not through the DNS. And if the result of this decision is affirmative to signify that the host name is resolvable, it is converted into an IP address and then is supplied to the client (step S11). The operation proceeds to step S12 in case the host name is resolvable, or returns to step S11 if resolution is impossible. Next, the client converts, into an IP address, the name of the relevant machine that is running the software of the caching manager (step S12).

The caching manager provides a proxy server having the information cached from the network which delivers the above service via the Internet.

Subsequently the client receives from the caching manager a file termed 0.dc (step S13). Then the operation proceeds to a reference file in accordance with the contents of 0.dc (step S14). Thereafter the operation proceeds to a channel catalog in accordance with the contents of the reference file (step S15), then proceeds to a channel file in accordance with the contents of the channel catalog (step S16), and further proceeds to a ticker file in accordance with the contents of the channel file (step S17).

Figure 8:
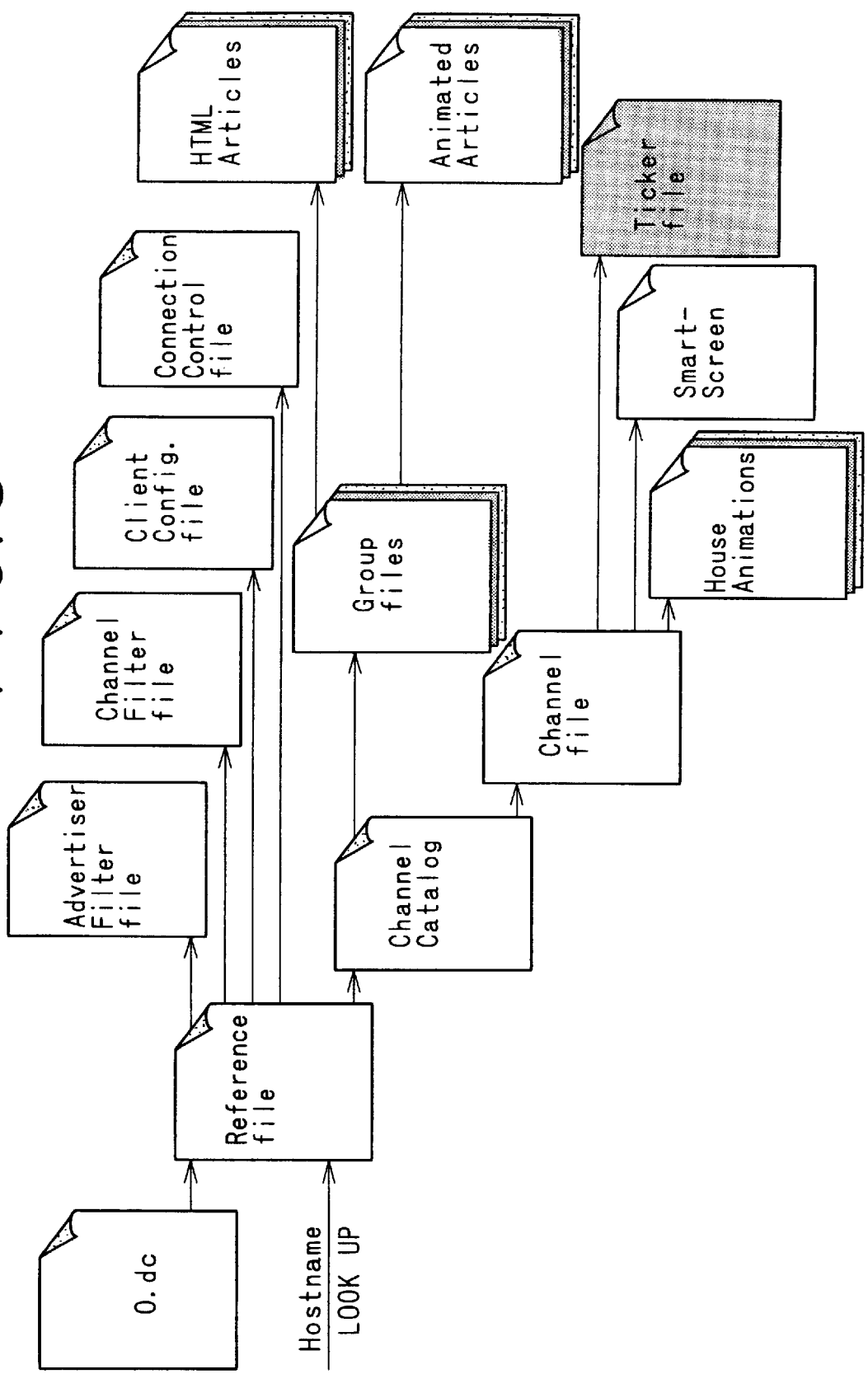
FIG. 8 shows the structure of data used in the routine of FIG. 7.
Figure 9:
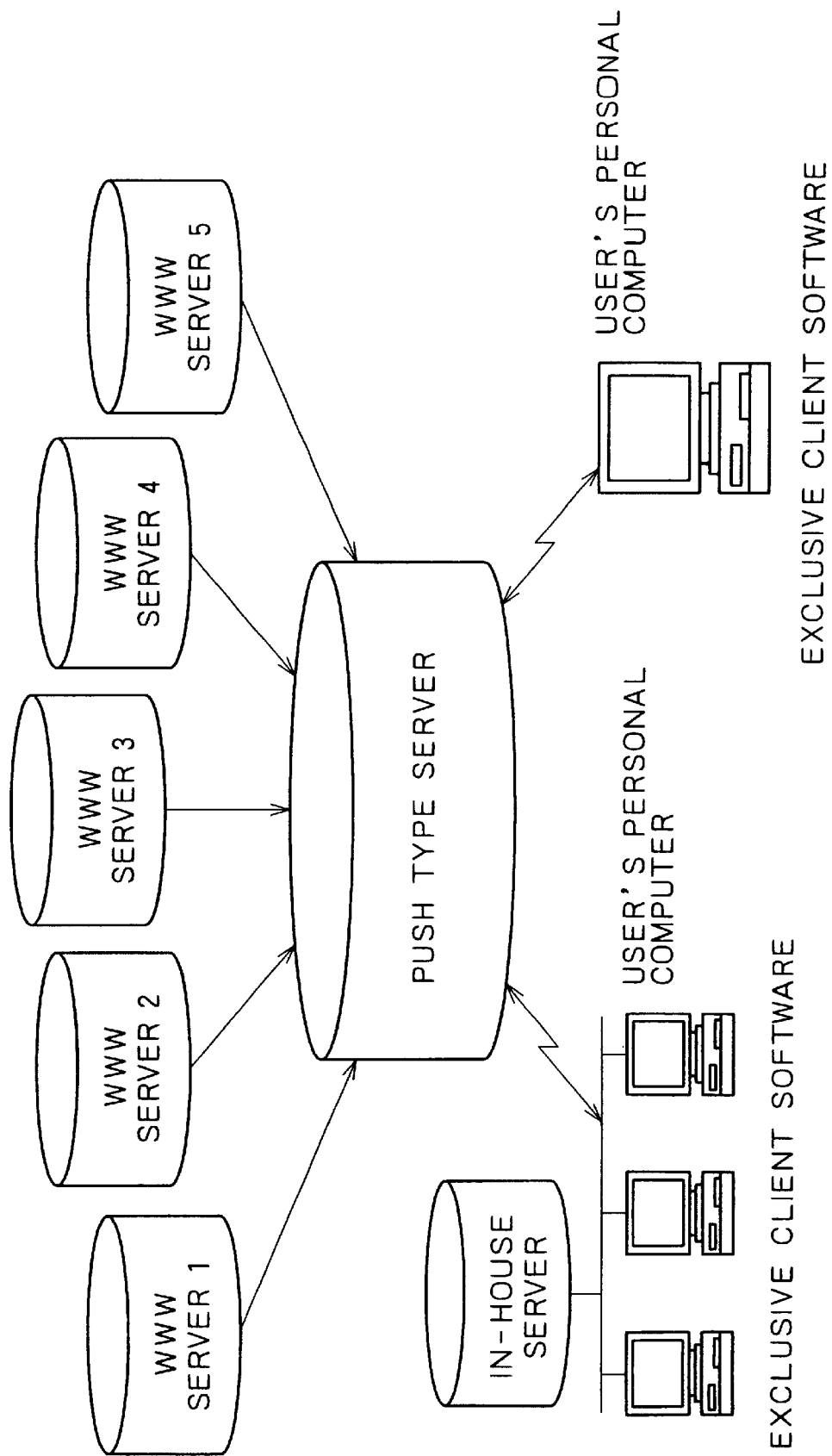
FIG. 9 shows a network configuration for processing push type data via the Internet.

Since the data of Point Cast (trade name) have the structure of FIG. 8, first the file 0.dc is received upon start of the software. As a URL (uniform resource locator) of the file under a required hierarchical structure is described in the file 0.dc, the push type data stored in the ticker file are detected by tracing the URL. And in the present invention, display on an electric bulletin board called a ticker is realized by the use of such detected data.

In the case of simple graphics, processing of animated articles may be executed.

The description given above is concerned with detection and display of push type data obtained via the Internet. However, the configuration may be modified in such a manner that, on the push type data transmitter side, the push type data received via the Internet are detected and then are sent through superimposition on digital broadcast waves utilizing a satellite or cable or on analog broadcast waves utilizing terrestrial waves, and such broadcast waves are received and displayed on the push type data receiver side.

Thus, according to the present invention, a push type data display means is incorporated in a push type data receiving apparatus or a device connected thereto electrically, so that it becomes possible to always display the push type data on the network as a stand-alone without the necessity of operating a personal computer and so forth on the data receiving side. Therefore, in general homes for example employing a modem with a telephone line, an ISDN terminal adaptor, a cable modem or the like as an entrance to receive a network service such as the Internet, new media are rendered realizable, in place of television or radio, by storing and displaying push type data continuously via a linked infrastructure through the use of a major time period during which none of pull type service is utilized.

Further, due to display of the data by the use of a simple display device suited to be incorporated in a receiving apparatus or the like, it becomes possible to watch the push type data without the necessity of booting up a system inclusive of a personal computer and so forth.

A cable modem or an ISDN terminal adaptor having a router function is not equipped with a display means. Therefore, in any apparatus currently available, a router works as a handy server via an Ethernet, and various networks are set by a browser in the personal computer. In contrast therewith, such setting is achievable in the apparatus alone of the present invention due to the existence of display means incorporated therein. Consequently, remarkable improvements are attainable in the user interface and reduction of required software.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. Push type data receiving apparatus comprising:
   an input device connected to receive and demodulate push type data transmitted from a source, said input device operating as an entrance for direct reception of said push type data; and
   a display electrically connected to said input device for displaying the received and demodulated push type data, wherein said input device is a television receiver having a display screen, and said display is a display unit integrally incorporated into said television receiver separate and apart from said display screen.

2. The apparatus of claim 1, wherein said input device is a video monitor having a display screen, and said display is a display unit integrally incorporated into said video monitor separate and apart from said display screen.

3. The apparatus of claim 1, wherein said display is integrally incorporated into a clock.

* * * * *